(12) United States Patent
Yang et al.

(10) Patent No.: US 12,519,183 B2
(45) Date of Patent: Jan. 6, 2026

(54) BATTERY CELL, BATTERY, AND ELECTRICAL DEVICE

(71) Applicant: CONTEMPORARY AMPEREX TECHNOLOGY (HONG KONG) LIMITED, Hong Kong (CN)

(72) Inventors: Kaihuan Yang, Ningde (CN); Wenlin Zhou, Ningde (CN); Qi Cheng, Ningde (CN); Quankun Li, Ningde (CN); Peng Wang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 19/036,716

(22) Filed: Jan. 24, 2025

(65) Prior Publication Data

US 2025/0174844 A1 May 29, 2025

Related U.S. Application Data

(63) Continuation of application No. PCT/CN2022/114882, filed on Aug. 25, 2022.

(51) Int. Cl.
*H01M 50/533* (2021.01)
*H01M 50/103* (2021.01)
(Continued)

(52) U.S. Cl.
CPC ....... *H01M 50/533* (2021.01); *H01M 50/103* (2021.01); *H01M 50/15* (2021.01);
(Continued)

(58) Field of Classification Search
CPC ............ H01M 50/533; H01M 50/474; H01M 50/103; H01M 50/15; H01M 2220/20;
(Continued)

(56) References Cited

U.S. PATENT DOCUMENTS

2019/0067664 A1    2/2019   Kwak

FOREIGN PATENT DOCUMENTS

| CN | 207743310 U | 8/2018 |
| CN | 208256795 U | 12/2018 |

(Continued)

OTHER PUBLICATIONS

CN 207743310 Google Patent Translation (Year: 2025).*

(Continued)

*Primary Examiner* — Lingwen R Zeng
(74) *Attorney, Agent, or Firm* — ANOVA LAW GROUP, PLLC

(57) ABSTRACT

A battery cell includes: an end cap assembly, including an electrode terminal; a housing, on which an opening is created, where the end cap assembly seals the opening; an electrode assembly, disposed in the housing, where the electrode assembly includes a tab; an adapter component, connected between the tab and the electrode terminal, where the adapter component includes a first connecting region configured to be connected to the electrode terminal, a second connecting region configured to be connected to the tab, and a transitional connecting region located between the (Continued)

first connecting region and the second connecting region; and an insulation piece, covering at least a part of the transitional connecting region.

14 Claims, 12 Drawing Sheets

(51) Int. Cl.
 *H01M 50/15* (2021.01)
 *H01M 50/474* (2021.01)
 *H01M 50/531* (2021.01)
 *H01M 50/55* (2021.01)
 *H01M 50/586* (2021.01)
 *H01M 50/591* (2021.01)

(52) U.S. Cl.
 CPC ........ *H01M 50/474* (2021.01); *H01M 50/531* (2021.01); *H01M 50/55* (2021.01); *H01M 50/586* (2021.01); *H01M 50/591* (2021.01); *H01M 2220/20* (2013.01); *Y02E 60/10* (2013.01)

(58) Field of Classification Search
 CPC .. H01M 50/531; H01M 50/55; H01M 50/586; H01M 50/591; Y02E 60/10
 See application file for complete search history.

(56) References Cited

FOREIGN PATENT DOCUMENTS

| CN | 208507800 U | 2/2019 |
|---|---|---|
| CN | 209329018 U | 8/2019 |
| CN | 213660565 U | 7/2021 |
| CN | 113764799 A | 12/2021 |
| CN | 217158580 U | 8/2022 |
| CN | 115064847 A | 9/2022 |
| CN | 217507612 U | 9/2022 |
| CN | 217903377 U | 11/2022 |
| WO | 2022160494 A1 | 8/2022 |

OTHER PUBLICATIONS

CN 208256795 Google Patent Translation (Year: 2025).*
CN 209329018 Google Patent Translation (Year: 2025).*
CN 217158580 Google Patent Translation (Year: 2025).*
The World Intellectual Property Organization (WIPO) International Search Report for PCT/CN2022/114882 May 12, 2023 7 Pages (including translation).
The European Patent Office (EPO) The Extended European Search Report for Application No. 22956075.0 Oct. 16, 2025 12 Pages.

* cited by examiner

BATTERY CELL, BATTERY, AND ELECTRICAL DEVICE

CROSS-REFERENCE TO RELATED APPLICATION

This application is a continuation of International Application No. PCT/CN2022/114882, filed on Aug. 25, 2022, the entire content of which is incorporated herein by reference.

TECHNICAL FIELD

This application relates to the field of batteries, and in particular, to a battery cell, a battery, and an electrical device.

BACKGROUND

Energy conservation and emission reduction are key to sustainable development of the automobile industry. Electric vehicles have become an important part of the sustainable development of the automobile industry by virtue of energy saving and environmental friendliness. Battery technology is crucial to development of electric vehicles.

A battery cell includes a housing, an end cap assembly that caps off an opening of the housing, and an electrode assembly located in the housing. An electrode terminal is disposed on the end cap assembly. A tab of the electrode assembly is connected to the electrode terminal by an adapter component. During the transportation or use of the battery cell, the battery cell may incur problems such as thermal runaway, thereby impairing the safety performance of the battery cell.

SUMMARY

In view of the above problems, this application provides a battery cell, a battery, and an electrical device to improve the safety performance of the battery cell.

According to a first aspect, this application provides a battery cell. The battery cell includes: an end cap assembly, including an electrode terminal; a housing, on which an opening is created, where the end cap assembly seals the opening; an electrode assembly, disposed in the housing, where the electrode assembly includes a tab; an adapter component, connected between the tab and the electrode terminal, where the adapter component includes a first connecting region configured to be connected to the electrode terminal, a second connecting region configured to be connected to the tab, and a transitional connecting region located between the first connecting region and the second connecting region; and an insulation piece, covering at least a part of the transitional connecting region.

In the technical solution disclosed in an embodiment of this application, the battery cell includes an end cap assembly, a housing, an electrode assembly, an adapter component, and an insulation piece. The end cap assembly seals the opening of the housing. The electrode assembly is located in the housing. The end cap assembly and the housing can provide protection for the electrode assembly. The adapter component is connected between the tab and the electrode terminal through its own first connecting region and second connecting region, and is configured to lead the electrical energy of the electrode assembly out of the housing. The insulation piece covers at least a part of the transitional connecting region. On the one hand, the insulation piece can provide protection for the transitional connecting region, increase the service life of the transitional connecting region, and alleviate the problem that the transitional connecting region is prone to be broken by vibration; on the other hand, the insulation piece covers the transitional connecting region, so that the transitional connecting region can keep insulated from the electrode assembly or the end cap assembly when breaking off, thereby alleviating the short-circuiting between the adapter component and the electrode assembly or the end cap assembly, and improving the safety performance of the battery cell. In addition, when the battery cell is overcharged or an overcurrent flows through the battery cell due to other abnormalities, because the transitional connecting region is covered by the insulation piece, the transitional connecting region heats up faster than the first connecting region and the second connecting region, so that the transitional connecting region can melt and break more easily to cut off the current flow path between the tab and the electrode terminal, thereby substantially preventing the battery cell from exploding due to overcurrent. Therefore, in this application, the insulation piece covers the transitional connecting region of the adapter component, thereby improving the service life and safety performance of the battery cell.

In some embodiments, a minimum cross-sectional area of the transitional connecting region is greater than or equal to a minimum cross-sectional area of the first connecting region, and/or a minimum cross-sectional area of the transitional connecting region is greater than or equal to a minimum cross-sectional area of the second connecting region. In this embodiment, the cross-sectional area of the transitional connecting region is relatively large. The transitional connecting region is not prone to break when the battery cell vibrates, thereby increasing the service life of the adapter component. When thermal runaway occurs in the battery cell, because the insulation piece covers the transitional connecting region, the transitional connecting region heats up more quickly and can melt and break more easily, thereby improving the safety performance of the battery cell. Therefore, in this embodiment of this application, the adapter component subjected to heat is made to melt and break easily on the premise of not affecting the service life of the adapter component, thereby improving the safety performance of the battery cell.

In some embodiments, the insulation piece surrounds an outer circumference of the transitional connecting region. In this embodiment, the insulation piece is disposed around the transitional connecting region. In other words, the insulation piece wraps the entire transitional connecting region, thereby further improving the protection performance of the insulation piece and more effectively alleviating the short-circuiting between the adapter component and the electrode assembly or the end cap assembly. In addition, when the battery cell is thermally runaway, the temperature rise of the transitional connecting region wrapped by the insulation piece is faster, so that the transitional connecting region can melt and break more easily, thereby further improving the safety performance of the battery cell.

In some embodiments, at least a part of the tab covers the insulation piece. An edge, oriented toward the first connecting region, of the tab does not extend beyond the insulation piece. In these embodiments, the edge of the tab does not extend beyond the insulation piece, thereby preventing the tab from crossing the insulation piece and lapping the adapter component, and in turn, alleviating the short-circuiting problem of the battery cell.

In some embodiments, the tab includes a positive tab and a negative tab. The adapter component connects the positive tab and the electrode terminal. A first cross-sectional area of the transitional connecting region is A, a second cross-sectional area of the negative tab is B, and the first cross-sectional area and the second cross-sectional area satisfy 3A<2B. In these embodiments, when the first cross-sectional area and the second cross-sectional area satisfy the above relation, in a case that the battery cell is thermally runaway, the transitional connecting region of the adapter component is more easily breakable than the negative tab, so that the current flow path between the positive tab and the electrode terminal can be cut off in time, and so that the adapter component can be broken before the negative tab breaks, thereby further improving the safety performance of the battery cell.

In some embodiments, the positive tab and the adapter component are made of a material including aluminum, and the negative tab is made of a material including copper. In these embodiments, the positive tab and the adapter component are made of the same material. When the positive tab is welded to the adapter component, the connection strength can be increased between the positive tab and the adapter component. The negative tab includes copper. When the first cross-sectional area and the second cross-sectional area satisfy the above relation, the adapter component can be broken before the negative tab.

In some embodiments, the tab includes a plurality of sub-tabs. A thickness of each sub-tab is Z, the number of the sub-tabs is X, and a width of the sub-tab is D, satisfying: B=X×D×Z. In these embodiments, the second cross-sectional area of the tab is a sum of the cross-sectional areas of a plurality of stacked sub-tabs, so that the calculation of the second cross-sectional area of the tab is more accurate.

In some embodiments, the transitional connecting region includes a first part connected to the first connecting region and a second part connected to the second connecting region. A cross-sectional area of the first part is greater than a cross-sectional area of the second part. The first part includes a penetrating through-hole. At least a part of the insulation piece is embedded in the through-hole. In these embodiments, the insulation piece is partially embedded in the through-hole, thereby improving the stability of the relative position between the insulation piece and the adapter component.

In some embodiments, the second connecting region protrudes beyond the first connecting region. The transitional connecting region includes a corner part. The insulation piece covers at least the corner part. In these embodiments, the insulation piece covering the corner part can provide protection for the corner part and alleviate the problem that the corner part is prone to be damaged by collision.

In some embodiments, the electrode assembly includes a first electrode assembly and a second electrode assembly. The first electrode assembly includes a first tab. The second electrode assembly includes a second tab. The second connecting region includes a first sub-region configured to be connected to the first tab and a second sub-region configured to be connected to the second tab. The transitional connecting region includes a first partition located between the first sub-region and the first connecting region as well as a second partition located between the second sub-region and the first connecting region. The insulation piece includes a first subsection configured to cover at least a part of the first partition and a second subsection configured to cover at least a part of the second partition. The first subsection and the second subsection are separate from each other or formed in one piece.

In these embodiments, the number of electrode assemblies is plural. Each of the electrode assemblies includes a tab. In other words, the electrode assembly includes a first electrode assembly and a second electrode assembly, the first electrode assembly includes a first tab, and the second electrode assembly includes a second tab. The adapter component connects the tabs of the plurality of electrode assemblies. In other words, the second connecting region is connected to the first tab by using the first sub-region, and the second connecting region is connected to the second tab by using the second sub-region. The transitional connecting region includes a first partition located between the first sub-region and the first connecting region, and a second partition located between the second sub-region and the first connecting region. The insulation piece includes a first subsection and a second subsection. The first subsection and the second subsection cover the first partition and the second partition, respectively. In this way, when the battery cell is thermally runaway, both the first partition and the second partition can be easily broken, thereby cutting off the current flow path between the first tab and the electrode terminal as well as the current flow path between the second tab and the electrode terminal in time, and further improving the safety performance of the battery cell.

In some embodiments, the first sub-region and the second sub-region are interconnected into one piece, the first partition and the second partition are interconnected into one piece, and the first subsection and the second subsection are interconnected into one piece. In these embodiments, the first sub-region and the second sub-region are interconnected into one piece, and the second partition and the first partition are interconnected into one piece, thereby simplifying the structure of the adapter component. The first subsection and the second subsection are interconnected into one piece, thereby simplifying the structure of the insulation piece.

In some embodiments, the adapter component further includes an embossed region. The first connecting region is located inside the embossed region, and the insulation piece and the embossed region are spaced apart. In these embodiments, the first connecting region is located inside the embossed region, and the electrode terminal and the adapter component are interconnected in the embossed region. For example, the electrode terminal and the adapter component are welded to each other in the embossed region. The insulation piece and the embossed region are spaced apart, thereby alleviating the impact of high temperature on the insulation piece during welding, and alleviating the problem of the insulation piece melting due to heat.

In some embodiments, a minimum distance between the insulation piece and the first connecting region is 0.5 mm to 4 mm, and/or a minimum distance between the insulation piece and the second connecting region is 0.5 mm to 4 mm.

In these embodiments, the minimum distance between the insulation piece and the first connecting region is 0.5 mm to 4 mm, thereby alleviating the problem that the insulation piece is prone to be deformed by heat during welding between the first connecting region and the electrode terminal due to an insufficient distance between the insulation piece and the first connecting region. On the other hand, this setting also alleviates the problem that the transitional connecting region can be hardly melted off due to an insufficient temperature rise speed at the transitional connecting region, where the insufficient temperature rise speed is caused by an insufficient size of the insulation piece that arises from an excessive distance between the insulation piece and the first connecting region. The minimum distance between the insulation piece and the second connecting region is 0.5 mm to 4 mm, thereby alleviating the problem that the insulation piece is prone to be deformed by heat during welding between the second connecting region and the tab due to an insufficient distance between the insulation piece and the second connecting region. On the other hand, this setting also alleviates the problem that the transitional connecting region can be hardly melted off due to an insufficient temperature rise speed at the transitional connecting region, where the insufficient temperature rise speed is caused by an insufficient size of the insulation piece that arises from an excessive distance between the insulation piece and the first connecting region.

According to a second aspect, an embodiment of this application further provides a battery. The battery includes the battery cell according to any one of the embodiments in the first aspect. The battery cell is configured to provide electrical energy.

According to a third aspect, an embodiment of this application further provides an electrical device. The electrical device includes the battery cell according to any one of the embodiments in the first aspect.

The foregoing description is merely an overview of the technical solutions of this application. Some specific embodiments of this application are described below illustratively to enable a clearer understanding of the technical solutions of this application, enable implementation of the technical solutions based on the subject-matter hereof, and make the foregoing and other objectives, features, and advantages of this application more evident and comprehensible.

BRIEF DESCRIPTION OF DRAWINGS

By reading the following detailed description of exemplary embodiments, a person of ordinary skill in the art becomes clearly aware of various other advantages and benefits. The drawings are merely intended to illustrate the exemplary embodiments, but not to limit this application. In all the drawings, the same reference numeral represents the same component. In the drawings.

LIST OF REFERENCE NUMERALS

Figure 1:
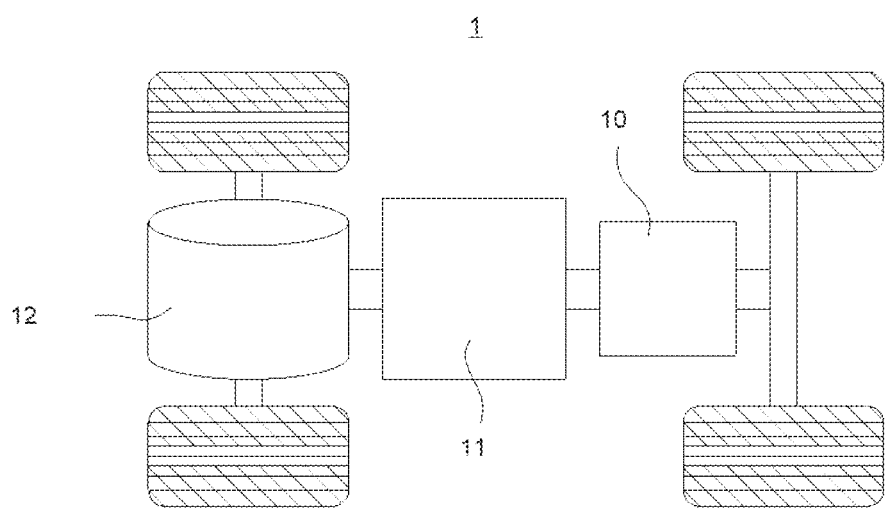
FIG. 1 is a schematic structural diagram of a vehicle according to an embodiment of this application.

1. vehicle; 10. battery; 11. controller; 12. motor;
20. battery module;
30. box; 301. first box portion; 302. second box portion;
40. battery cell;
100. electrode assembly; 101. first electrode assembly; 102. second electrode assembly;
110. tab; 110*a*. edge; 111. first tab; 112. second tab; 120. electrode body;
200. insulation piece; 210. first subsection; 220. second subsection;
300. end cap assembly; 310. electrode terminal;
400. housing; 410. opening;
500. adapter component; 510. first connecting region; 520. second connecting region; 521. first sub-region; 522. second sub-region; 530. transitional connecting region; 531. first part; 532. second part; 532*a*. through-hole; 533. corner part; 534. first partition; 535. second partition; 540. embossed region;
X. first direction; Y. second direction; Z. third direction

DETAILED DESCRIPTION OF EMBODIMENTS

Some embodiments of the technical solutions of this application are described in detail below with reference to the drawings. The following embodiments are merely intended as examples to describe the technical solutions of this application more clearly, but not intended to limit the protection scope of this application.

It is hereby noted that, unless otherwise specified, the technical terms or scientific terms used in embodiments of this application bear the meanings commonly understood by a person skilled in the technical field of embodiments of this application.

In the description of embodiments of this application, a direction or a positional relationship indicated by the terms such as "center", "longitudinal", "transverse", "length", "width", "thickness", "up", "down", "before", "after", "left", "right", "vertical", "horizontal", "top", "bottom", "in", "out", "clockwise", "counterclockwise", "axial", "radial", and "circumferential" is a direction or positional relationship based on the illustration in the drawings, and is merely intended for ease or brevity of description of embodiments of this application, but not intended to indicate or imply that the indicated device or component is necessarily located in the specified direction or constructed or operated in the specified direction. Therefore, such terms are not to be understood as a limitation on embodiments of this application.

In addition, the technical terms such as "first" and "second" are used merely for ease of description, but not to indicate or imply relative importance or implicitly specify the number of technical features mentioned. In the description of some embodiments of this application, unless otherwise expressly specified, "a plurality of" means two or more.

In the description of embodiments of this application, unless otherwise expressly specified and defined, the technical terms such as "mount", "concatenate", "connect", and "fix" are generic in a broad sense, for example, mean a fixed connection, a detachable connection, or a one-piece configuration; or mean a mechanical connection or an electrical connection; or mean a direct connection or an indirect connection implemented through an intermediary; or mean internal communication between two components or interaction between two components. A person of ordinary skill in the art can understand the specific meanings of the terms in some embodiments of this application according to specific situations.

In the description of embodiments of this application, unless otherwise expressly specified and defined, a first feature being "on" or "under" a second feature may mean that the first feature is in direct contact with the second feature, or the first feature is in indirect contact with the second feature through an intermediary. In addition, a first feature being "on", "above", or "over" a second feature may be that the first feature is exactly above or obliquely above the second feature, or simply that the first feature is at an altitude higher than the second feature. A first feature being "under", "below", or "beneath" a second feature may be that the first feature is exactly under or obliquely under the second feature, or simply that the first feature is at an altitude lower than the second feature.

Currently, as can be seen from the market trend, the application of power batteries is increasingly extensive. Power batteries are not only used in energy storage power systems such as hydro, thermal, wind, and solar power stations, but also widely used in electric means of transport such as electric bicycles, electric motorcycles, and electric vehicles, and used in many other fields such as military equipment and aerospace. The market demand for power batteries keeps soaring with the expansion of the application fields of the power batteries.

In this application, a battery cell may include a lithium-ion secondary battery cell, a lithium-ion primary battery cell, a lithium-sulfur battery cell, a sodium-lithium-ion battery cell, a sodium-ion battery cell, a magnesium-ion battery cell, or the like. The embodiments of this application do not limit the type of the battery cell. The battery cell may be in various shapes such as cylindrical, flat, cuboidal or other shapes. The shape of the battery cell is not limited herein.

The battery mentioned in embodiments of this application means a unitary physical module that includes one or more battery cells to provide a higher voltage and a higher capacity. For example, the battery mentioned in this application may include a battery module, a battery pack, or the like. A battery typically includes a box configured to package one or more battery cells. The box prevents liquid or other foreign matters from affecting the charging or discharging of the battery cells.

A battery cell includes an electrode assembly and an electrolyte solution. The electrode assembly includes a positive electrode plate, a negative electrode plate, and a separation plate. The battery cell works primarily by shuttling metal ions between the positive electrode plate and the negative electrode plate. The positive electrode plate includes a positive current collector and a positive active material layer. The positive active material layer overlays a surface of the positive current collector. The positive current collector includes a positive current collecting portion and a positive tab connected to the positive current collecting portion. The positive current collecting portion is coated with a positive active material layer, and the positive tab is not coated with the positive active material layer. Using a lithium-ion battery as an example, the positive current collector may be made of aluminum. The positive active material layer includes a positive active material. The positive active material may be lithium cobalt oxide, lithium iron phosphate, ternary lithium, lithium manganese oxide, or the like. The negative electrode plate includes a negative current collector and a negative active material layer. The negative active material layer is applied onto a surface of the negative current collector. The negative current collector includes a negative current collecting portion and a negative tab connected to the negative current collecting portion. The negative current collecting portion is coated with a negative active material layer, and the negative tab is not coated with the negative active material layer. The negative current collector may be made of copper. The negative active material layer includes a negative active material. The negative active material may be carbon, silicon, or the like. The separation plate may be made of a material such as polypropylene (PP) or polyethylene (PE).

The applicant hereof is aware that a battery cell includes a housing, an end cap assembly that caps off an opening of the housing, and an electrode assembly located in the housing. A tab of the electrode assembly is connected to an electrode terminal on the end cap assembly by an adapter component. During the use of the battery cell, the battery cell may be overcharged or an overcurrent may flow through the battery cell due to other abnormalities. The overcurrent flow causes the temperature to rise, and gives rise to safety problems of the battery cell.

In the related art, a fragile region is usually created on the adapter component. When an overcurrent flows in the battery cell, the fragile region can melt and break more easily to cut off the current flow path between the tab and the electrode terminal. However, during the transportation and use of the battery cell, the fragile region is also prone to be broken off by mechanical vibration, thereby drastically impairing the service life of the adapter component and the battery cell.

In order to solve the above technical problems, the applicant hereof has found through research that an insulation piece may cover a specified region of the adapter component. When an overcurrent flows in the battery cell, the part covered with the insulation piece heats up faster and breaks off more easily. At the same time, the insulation piece can provide protection for this region to alleviate the problem of this region being prone to be broken by mechanical vibration.

In view of the above, in order to solve the safety problem caused by the overcurrent flow in the battery cell, the applicant hereby designs a battery cell, a battery, and an electrical device through in-depth research. In such a battery cell, the battery cell includes: an end cap assembly, including an electrode terminal; a housing, on which an opening is created, where the end cap assembly seals the opening; an electrode assembly, disposed in the housing, where the electrode assembly includes a tab; an adapter component, connected between the tab and the electrode terminal, where the adapter component includes a first connecting region configured to be connected to the electrode terminal, a second connecting region configured to be connected to the tab, and a transitional connecting region located between the first connecting region and the second connecting region; and an insulation piece, covering at least a part of the transitional connecting region.

The technical solution disclosed in this embodiment of this application is applicable to a battery and an electrical device that uses the battery.

The electrical device may be a vehicle, a mobile phone, a portable device, a notebook computer, a ship, a spacecraft, an electric toy, an electric tool, or the like. The vehicle may be an oil-fueled vehicle, a natural gas vehicle, or a new energy vehicle. The new energy vehicle may be a battery electric vehicle, a hybrid electric vehicle, a range-extended electric vehicle, or the like. The spacecraft includes an airplane, a rocket, a space shuttle, a spaceship, and the like. The electric toy includes a fixed or mobile electric toy, such as a game console, an electric car toy, an electric ship toy, an electric airplane toy, and the like. The power tool includes an electrical metal cutting tool, an electrical grinding tool, an electrical assembling tool, and a power tool for use in railways. Examples of the power tool are an electrical drill, an electrical grinder, an electrical wrench, an electrical screwdriver, an electrical hammer, an electrical impact drill, a concrete vibrator, an electrical planer, and the like. The electrical device is not particularly limited in embodiments of this application.

Understandably, the technical solutions described in an embodiment of this application are not only applicable to the battery and electrical device described above, but also applicable to all batteries containing a box and all electrical devices powered by a battery. However, for brevity, the following embodiments are described by using an electric vehicle as an example.

Referring to FIG. 1, FIG. 1 is a schematic structural diagram of a vehicle 1 according to some embodiments of this application. The vehicle 1 may be an oil-fueled vehicle, a natural gas vehicle, or a new energy vehicle. The new energy vehicle may be a battery electric vehicle, a hybrid electric vehicle, a range-extended electric vehicle, or the like. A battery 10 is disposed inside the vehicle 1. The battery 10 may be disposed at the bottom, front, or rear of the vehicle 1. The battery 10 may be configured to supply power to the vehicle 1. For example, the battery 10 may serve as an operating power supply of the vehicle 1. The vehicle 1 may further include a controller 11 and a motor 12. The controller 11 is configured to control the battery 10 to supply power to the motor 12, for example, to meet electrical energy requirements in starting, navigating, or running the vehicle 1.

In some embodiments of this application, the battery 10 serves not only as an operating power supply of the vehicle 1, but may also serve as a driving power supply of the vehicle 1 to provide driving power for the vehicle 1 in place of or partly in place of fuel oil or natural gas.

To meet different power use requirements, the battery 10 may include a plurality of battery cells. A battery cell is a minimum unit that makes up a battery module or battery pack. A plurality of battery cells may be connected together in series and/or parallel through electrode terminals, so as to be applied in various scenarios. A battery referred to in this application includes a battery module or a battery pack. The plurality of battery cells may be connected in series, parallel, or series-and-parallel pattern. The series-and-parallel pattern means a combination of series connection and parallel connection. In embodiments of this application, the plurality of battery cells may directly make up a battery pack, or form a battery module 20 before a plurality of battery modules 20 make up a battery pack.

Figure 2:
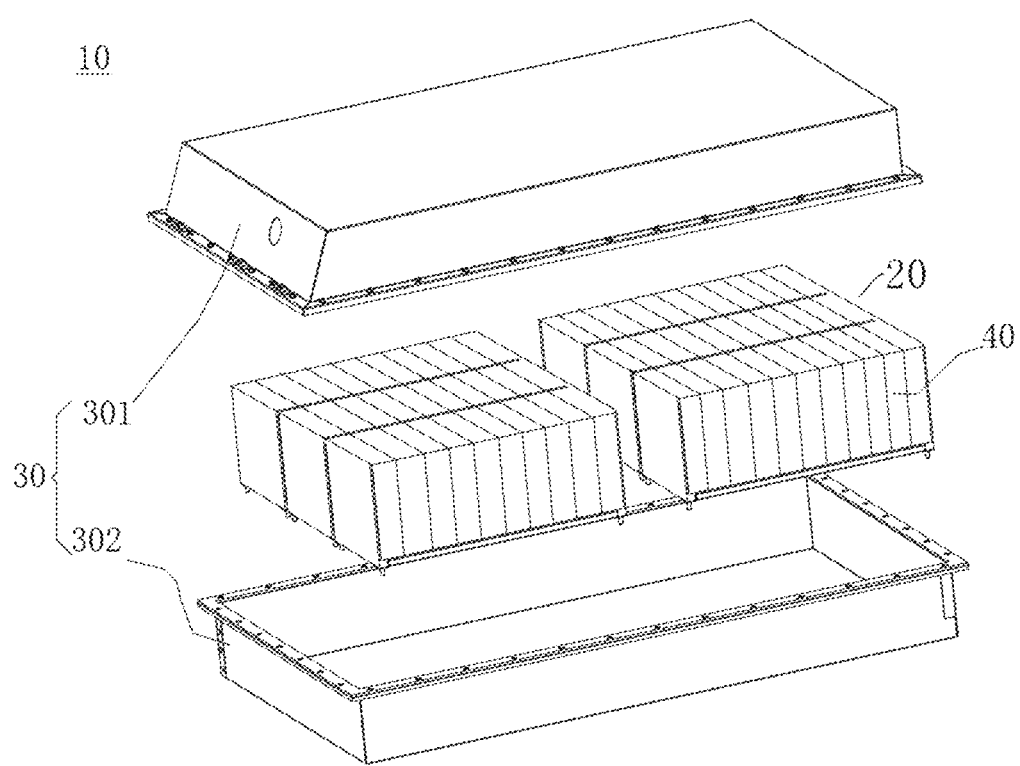
FIG. 2 is a schematic structural diagram of a battery pack according to an embodiment of this application.

FIG. 2 is a schematic structural diagram of a battery 10 according to an embodiment of this application.

As shown in FIG. 2, the battery 10 includes a box 30 and a battery cell 40. The battery cell 40 is accommodated in the box 30.

The box 30 may be a simple three-dimensional structure such as a stand-alone cuboid or cylinder or sphere, or may be a complex three-dimensional structure compounded of simple three-dimensional structures such as cuboids, cylinders or spheres, without being limited herein. The material of the box 30 may be an alloy material such as aluminum alloy or iron alloy, or a polymer material such as polycarbonate or polyisocyanurate foam plastic, or a composite material compounded of glass fiber and epoxy resin, without being limited herein.

The box 30 is configured to accommodate the battery cell 40. The box 30 may be one of various structures. In some embodiments, the box 30 may include a first box portion 301 and a second box portion 302. The first box portion 301 and the second box portion 302 fit each other. The first box portion 301 and the second box portion 302 together define an accommodation space configured to accommodate the battery cell 40. The second box portion 302 may be a hollow structure opened at one end. The first box portion 301 is a plate structure. The first box portion 301 fits and covers the opening of the second box portion 302 to form the box 30 that includes the accommodation space. Alternatively, the first box portion 301 and the second box portion 302 each may be a hollow structure opened at one end. The opening of the first box portion 301 fits the opening of the second box portion 302 to form the box 30 that includes the accommodation space. Definitely, the first box portion 301 and the second box portion 302 may be in various shapes, such as a cylinder or a cuboid.

To improve airtightness between the first box portion 301 and the second box portion 302 that are connected, a sealing element such as a sealant or a sealing ring may be disposed between the first box portion 301 and the second box portion 302.

Assuming that the first box portion 301 fits on the top of the second box portion 302, the first box portion 301 may also be referred to as an upper box, and the second box portion 302 may also be referred to as a lower box 30.

The battery 10 may contain one or more battery cells 40. If there are a plurality of battery cells 40, the plurality of battery cells 40 may be connected in series, parallel, or series-and-parallel pattern. The series-and-parallel pattern means a combination of series connection and parallel connection of the plurality of battery cells 40. The plurality of battery cells 40 may be directly connected in series, parallel, or series-and-parallel pattern, and then the whole of the plurality of battery cells 40 may be accommodated in the box 30. Alternatively, the plurality of battery cells 40 may be connected in series, parallel, or series-and-parallel pattern to form a battery module 20 first. A plurality of battery modules 20 are then connected in series, parallel, or series-and-parallel pattern to form a whole for being accommodated in the box 30.

Still referring to FIG. 2, in some embodiments, there are a plurality of battery cells 40. The plurality of battery cells 40 are connected in series, parallel, or series-and-parallel pattern to form a battery module 20 first. A plurality of battery modules 20 are then connected in series, parallel, or series-and-parallel pattern to form a whole for being accommodated in the box 30.

The plurality of battery cells 40 in the battery module 20 may be electrically connected by a busbar component, so as to implement parallel, series, or series-and-parallel connection between the plurality of battery cells 40 in the battery module 20.

In this application, the battery cell 40 may be a lithium-ion battery cell 40, a sodium-ion battery cell 40, a magnesium-ion battery cell 40, or the like. The type of the battery cell is not limited herein. The battery cell 40 may be in a cylindrical shape, a flat shape, a cuboidal shape, or other shapes, without being limited herein. Depending on the form of packaging, the battery cell 40 is typically classed into three types: cylindrical battery cell 40, prismatic battery cell 40, and pouch-type battery cell 40, without being limited herein. For brevity, the following embodiments are described by using a prismatic cell 40 as an example.

Figure 3:
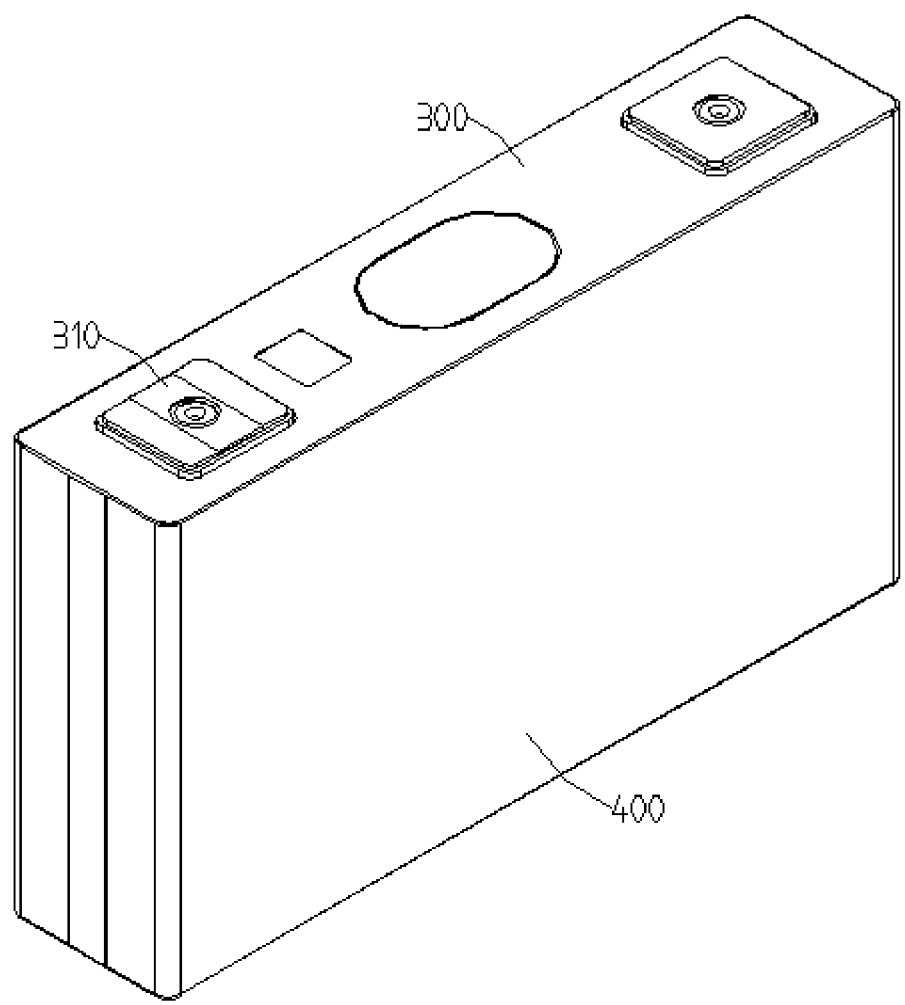
FIG. 3 is a schematic structural diagram of a battery cell according to an embodiment of this application.
Figure 4:
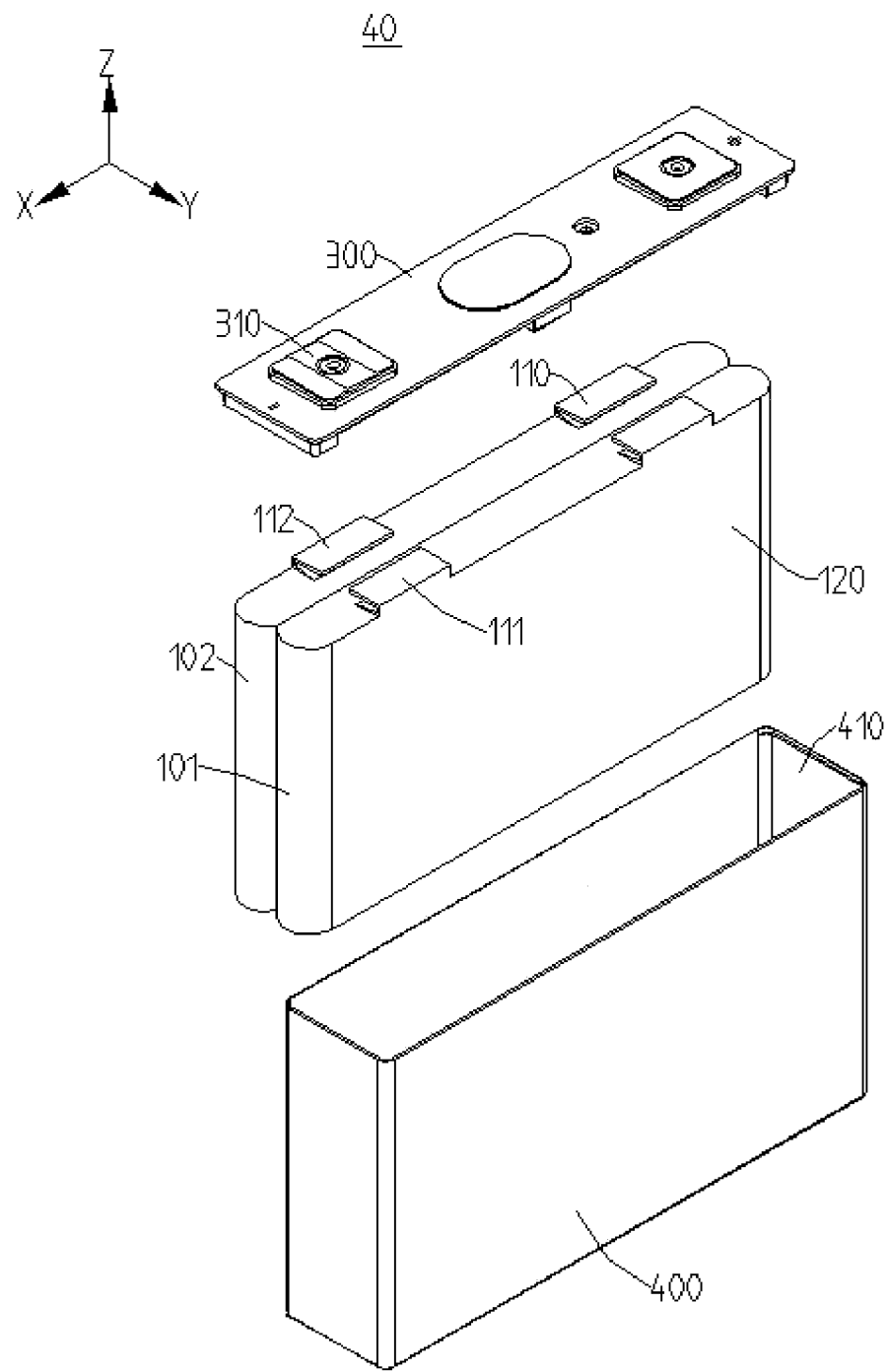
FIG. 4 is a schematic exploded view of a battery cell according to an embodiment of this application.
Figure 5:
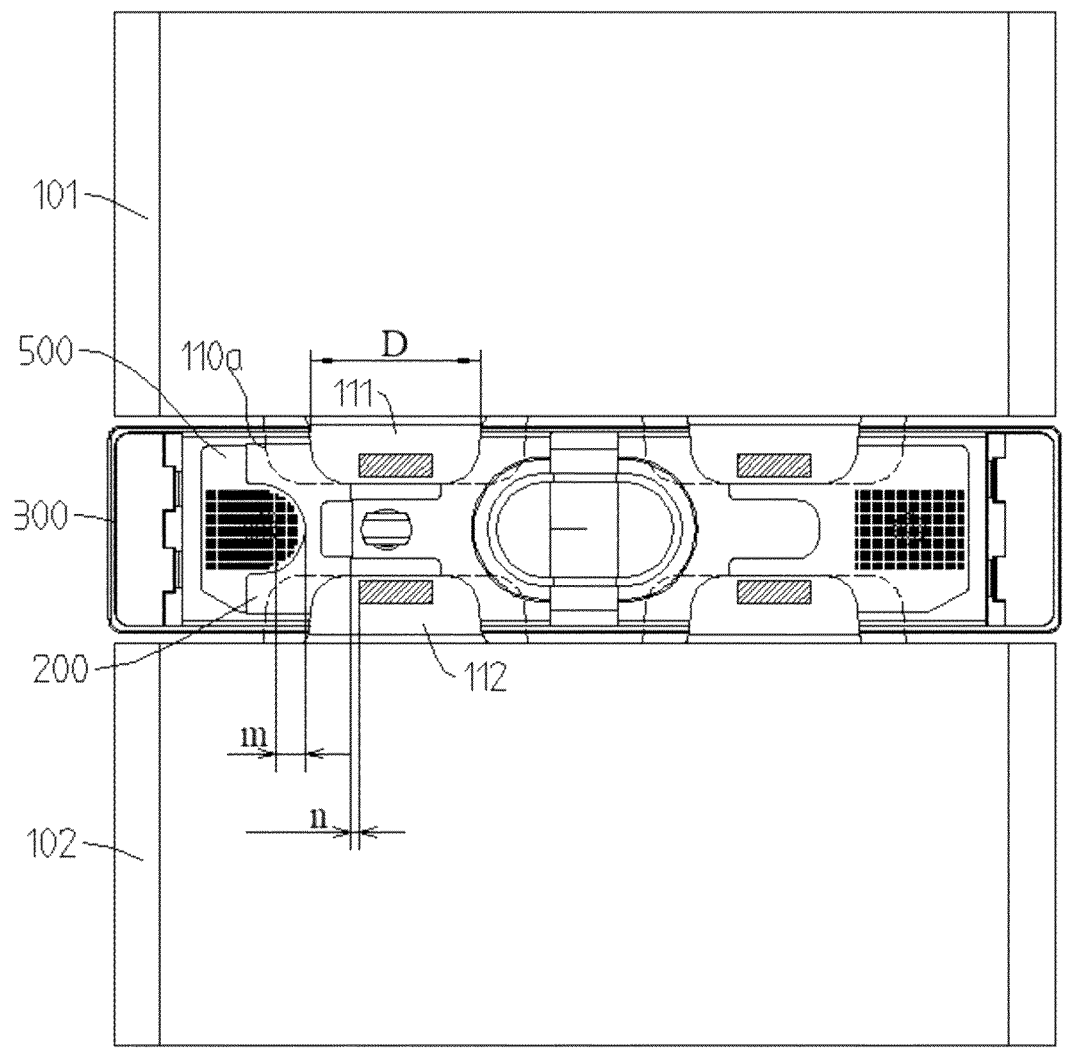
FIG. 5 is a schematic diagram of a process of preparing a battery cell according to an embodiment of this application.

FIG. 3 is a schematic structural diagram of a battery cell 40 according to some embodiments of this application, and FIG. 4 is a schematic exploded view of a battery cell 40 according to some embodiments of this application. FIG. 5 is a schematic diagram of a process of preparing a battery cell 40 according to some embodiments of this application.

As shown in FIG. 3 to FIG. 5, the battery cell 40 includes: an end cap assembly 300, a housing 400, an electrode assembly 100, and an insulation piece 200. The end cap assembly 300 includes an electrode terminal 310. An opening 410 is created on the housing 400. The end cap assembly 300 seals the opening 410. The electrode assembly 100 is disposed in the housing 400. The electrode assembly 100 includes a tab 110. An adapter component 500 is connected between the tab 110 and the electrode terminal 310. The adapter component 500 includes a first connecting region 510 configured to be connected to the electrode terminal 310, a second connecting region 520 configured to be connected to the tab 110, and a transitional connecting region 530 located between the first connecting region 510 and the second connecting region 520. The insulation piece 200 covers at least a part of the transitional connecting region 530.

The housing 400 and the end cap assembly 300 are combined to form a shell of the battery cell 40. The electrode assembly 100 and the insulation piece 200 are located in the housing 400.

The end cap assembly 300 is a component that caps off the opening 410 of the housing 400 to isolate the internal environment of the battery cell 40 from the external environment. Without limitation, the shape of the end cap assembly 300 may be adapted to the shape of the housing 400 to fit the housing 400. Optionally, the end cap assembly 300 may be made of a material of appropriate hardness and strength (such as aluminum alloy), so that the end cap assembly 300 is not prone to deform when squeezed or impacted. In this way, the battery cell 40 achieves higher structural strength and higher safety performance. Functional components such as an electrode terminal 310 may be disposed on the end cap assembly 300. The electrode terminal 310 may be configured to be electrically connected to the electrode assembly 100 to output or input electrical energy of the battery cell 40.

In some embodiments, a pressure relief mechanism configured to release an internal pressure when the internal pressure or temperature of the battery cell 40 reaches a threshold may be further disposed on the end cap assembly 300. The end cap assembly 300 may also be made of a variety of materials such as copper, iron, aluminum, stainless steel, aluminum alloy, or plastic, and the materials are not particularly limited herein.

The electrode assembly 100 may further include an electrode body 120. The tab 110 extends out from one side of the electrode body 120. The electrode body 120 is primarily formed by winding an electrode plate 100a and separator 100b, where the electrode plate is coated with an active material. The electrode plate 100a includes a positive electrode plate and a negative electrode plate. The tab 110 extends beyond the electrode body 120. The tab 110 and the electrode body 120 are combined to form the electrode assembly 100. The electrode assembly 100 is a component in which electrochemical reactions occur in the battery cell 40. The housing 400 may contain one or more electrode assemblies 100. The tab 110 includes a positive tab and a negative tab. The part coated with no active material on the positive electrode plate forms a positive tab, and the part coated with no active material on the negative electrode plate forms a negative tab. The positive tab and the negative tab may be located together at one end of the electrode body 120 or located at two ends of the electrode body 120 respectively.

The housing 400 is a component configured to fit the end cap assembly 300 to form an internal environment of the battery cell 40. The formed internal environment may be used to accommodate the electrode assembly 100, an electrolyte solution (not shown in the drawing), and other components. The housing 400 and the end cap assembly 300 may be stand-alone components. An opening 410 may be created on the housing 400. At the opening 410, the end cap assembly 300 caps off the opening 410 to form the internal environment of the battery cell 40. Without limitation, the end cap assembly 300 and the housing 400 may be integrated instead. Specifically, the end cap assembly 300 and the housing 400 may form a common connection interface before other components are put into the housing. Subsequently, when the interior of the housing 400 needs to be sealed, the end cap assembly 300 is made to fit with the housing 400. The housing 400 may be in various shapes and sizes, such as a cuboid, cylinder, or hexagonal prism. Specifically, the shape of the housing 400 may depend on the specific shape and size of the electrode assembly 100. The housing 400 may be made of a variety of materials such as copper, iron, aluminum, stainless steel, aluminum alloy, or plastic, without being particularly limited herein.

The adapter component 500 is configured to connect the tab 110 and the electrode terminal 310. The adapter component 500 may be in various shapes as long as the adapter component 500 can extend between the tab 110 and the electrode terminal 310 and as long as the adapter component 500 includes a first connecting region 510 connected to the electrode terminal 310, a second connecting region 520 connected to the tab 110, and a transitional connecting region 530 located between the first connecting region 510 and the second connecting region 520. The adapter component 500 may be made of a material including a metal material. For example, the material of the adapter component 500 may include a copper material, an aluminum material, or the like. When at least two electrode assemblies 100 are disposed in the battery cell 40, the adapter component 500 may be connected between the tabs 110 of the at least two electrode assemblies 100 and the same electrode terminal 310. The at least two tabs 110 connected to the adapter component 500 are tabs 110 of the same polarity. Optionally, at least a part of the adapter component 500 is located between an end face of the electrode body 120 and the end cap assembly 300.

The positive tab may be connected to the positive electrode terminal by one adapter component 500, and the negative tab may be connected to the negative electrode terminal by another adapter component 500. The insulation piece 200 may cover at least a part of the transitional connecting region 530 of at least one adapter component 500. The insulation piece 200 may be made of a variety of materials. The insulation piece 200 may be made of insulating materials such as rubber or plastic. The insulation piece 200 is made of rubber so that the insulation piece 200 is of appropriate elasticity, thereby improving the resilience of the transitional connecting region 530 under stress. The insulation piece 200 may cover a surface of the transitional connecting region 530, the surface being oriented toward the end cap assembly 300. Alternatively, the insulation piece 200 may be located on a surface of the transitional connecting region 530, the surface being oriented toward the electrode body 120. Alternatively, the insulation piece 200 may wrap around the transitional connecting region 530.

In the technical solution disclosed in an embodiment of this application, the battery cell 40 includes an end cap assembly 300, a housing 400, an electrode assembly 100, an adapter component 500, and an insulation piece 200. The end cap assembly 300 seals the opening 410 of the housing 400. The electrode assembly 100 is located in the housing 400. The end cap assembly 300 and the housing 400 can provide protection for the electrode assembly 100. The adapter component 500 is connected between the tab 110 and the electrode terminal 310 through its own first connecting region 510 and second connecting region 520, and is configured to lead the electrical energy of the electrode assembly 100 out of the housing 400. The insulation piece 200 covers at least a part of the transitional connecting region 530. On the one hand, the insulation piece 200 can provide protection for the transitional connecting region 530, increase the service life of the transitional connecting region 530, and alleviate the problem that the transitional connecting region 530 is prone to be broken by vibration; on the other hand, the insulation piece 200 covers the transitional connecting region 530, so that the transitional connecting region 530 can keep insulated from the electrode assembly 100 or the end cap assembly 300 when breaking off, thereby alleviating the short-circuiting between the adapter component 500 and the electrode assembly 100 or the end cap assembly 300, and improving the safety performance of the battery cell 40. In addition, when the battery cell 40 is overcharged or an overcurrent flows through the battery cell 40 due to other abnormalities, because the transitional connecting region 530 is covered by the insulation piece 200, the transitional connecting region 530 heats up faster than the first connecting region 510 and the second connecting region 520, so that the transitional connecting region 530 can melt and break more easily to cut off the current flow path between the tab 110 and the electrode terminal 310, thereby substantially preventing the battery cell 40 from exploding due to overcurrent. Therefore, in this embodiment of this application, the insulation piece 200 covers the transitional connecting region 530 of the adapter component 500, thereby improving the service life and safety performance of the battery cell 40.

According to some embodiments of this application, a minimum cross-sectional area of the transitional connecting region 530 is greater than or equal to a minimum cross-sectional area of the first connecting region 510, and/or a minimum cross-sectional area of the transitional connecting region 530 is greater than or equal to a minimum cross-sectional area of the second connecting region 520.

The cross-sectional area of the transitional connecting region 530 is the cross-sectional area of the transitional connecting region 530 in the thickness direction Z of the adapter component 500. The minimum cross-sectional area of the transitional connecting region 530 means the minimum cross-sectional area of the transitional connecting region 530 in the thickness direction Z. Similarly, the minimum cross-sectional area of the first connecting region 510 means the minimum cross-sectional area of the first connecting region 510 in the thickness direction Z, and the minimum cross-sectional area of the second connecting region 520 means the minimum cross-sectional area of the second connecting region 520 in the thickness direction Z.

For example, the first direction X is a length direction, the second direction Y is a width direction, and the first connecting region 510 and the second connecting region 520 are spaced apart along the first direction X. When the thickness of the adapter component 500 is equalized at every position, that is, when the thickness is equalized between the transitional connecting region 530, the first connecting region 510, and the second connecting region 520, the minimum cross-sectional area of the transitional connecting region 530 may be the cross-sectional area at the minimum-width position of the transitional connecting region 530, that is, the cross-sectional area at a position where the transitional connecting region 530 extends by the smallest amount of dimension in the second direction Y. The first direction X may be the length direction of the electrode assembly 100. When there are a plurality of electrode assemblies 100, the second direction Y may be a direction in which the plurality of electrode assemblies 100 are arranged in parallel.

In such optional embodiments, the cross-sectional area of the transitional connecting region 530 is relatively large. The transitional connecting region 530 is not prone to break when the battery cell 40 vibrates, thereby increasing the service life of the adapter component 500. When thermal runaway occurs in the battery cell 40, because the insulation piece 200 covers the transitional connecting region 530, the transitional connecting region 530 heats up more quickly and can melt and break more easily, thereby improving the safety performance of the battery cell 40. Therefore, in such embodiments of this application, the adapter component 500 subjected to heat is made to melt and break easily on the premise of not affecting the service life of the adapter component 500, thereby improving the safety performance of the battery cell 40.

Figure 6:
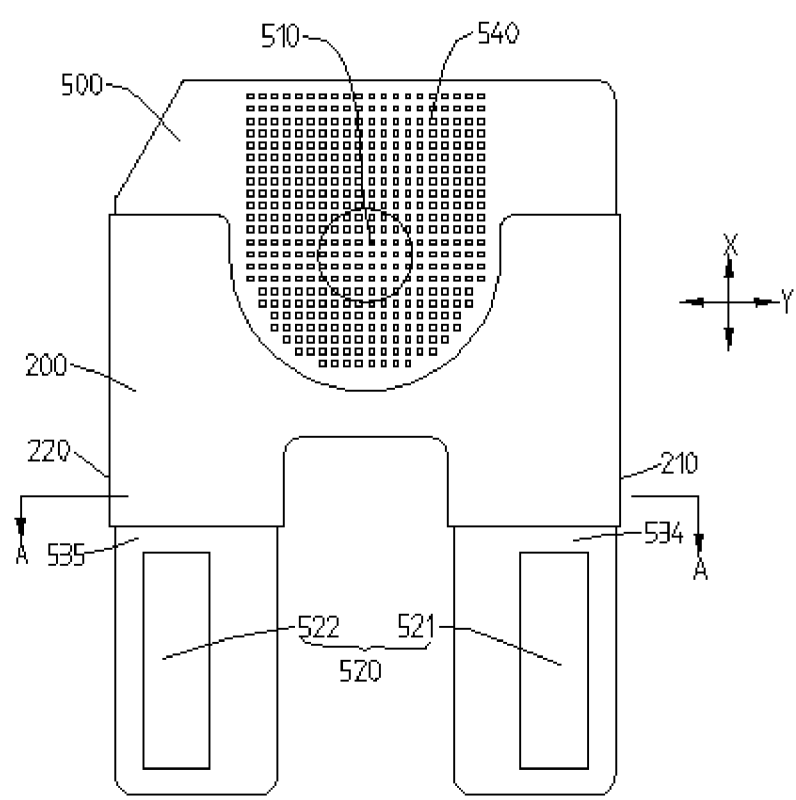
FIG. 6 is a schematic structural diagram of mutual coordination between an adapter component and an insulation piece in a battery cell according to an embodiment of this application.
Figure 7:
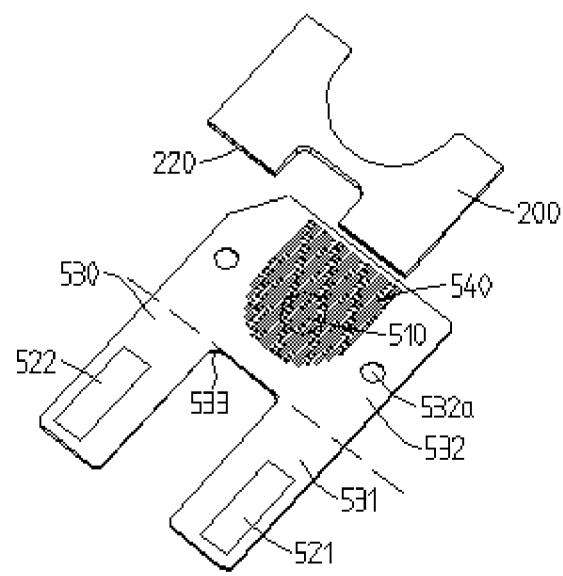
FIG. 7 is a schematic exploded view of FIG. 6.
Figure 8:
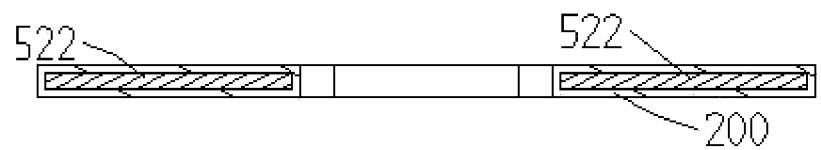
FIG. 8 is a cross-sectional view of sectioning along an A-A line shown in FIG. 6.

Referring to FIG. 6 to FIG. 8, FIG. 6 is a schematic structural diagram of coordination between an adapter component and an insulation piece in a battery cell 40 according to some embodiments of this application; FIG. 7 is a schematic exploded view of FIG. 6; and FIG. 8 is a cross-sectional view of sectioning along an A-A line shown in FIG. 6.

According to some embodiments of this application, as shown in FIG. 6 to FIG. 8, the insulation piece 200 surrounds an outer circumference of the transitional connecting region 530.

That the insulation piece 200 surrounds an outer circumference of the transitional connecting region 530 means that the insulation piece 200 is cylindrical and is sleeved around the transitional connecting region 530, so that the circumference of the transitional connecting region 530 is entirely covered by the insulation piece 200.

In such optional embodiments, the insulation piece 200 is disposed around the transitional connecting region 530. In other words, the insulation piece 200 wraps the entire transitional connecting region 530, thereby further improving the protection performance of the insulation piece 200 and more effectively alleviating the short-circuiting between the adapter component 500 and the electrode assembly 100 or the end cap assembly 300. In addition, when the battery cell 40 is thermally runaway, the temperature rise of the transitional connecting region 530 wrapped by the insulation piece 200 is faster, so that the transitional connecting region 530 can melt and break more easily, thereby further improving the safety performance of the battery cell 40.

According to some embodiments of this application, still referring to FIG. 5, at least a part of the tab 110 covers the insulation piece 200. An edge 110a, oriented toward the first connecting region 510, of the tab 110 does not extend beyond the insulation piece 200.

That the tab 110 covers the insulation piece 200 includes: the tab 110 covers only the second connecting region 520; or, the tab 110 extends from the second connecting region 520 toward the first connecting region 510, that is, the tab 110 may cover at least a part of the transitional connecting region 530, as long as the edge 110a, oriented toward the first connecting region 510, of the tab 110 does not extend beyond the insulation piece 200. The edge 110a, oriented toward the first connecting region 510, of the tab 110 means an edge, close to the first connecting region 510, of the tab 110.

When the tab 110 includes a plurality of sub-tabs, in a case that the sub-tabs 110 in layers are staggered from each other, the edge 110a is the edge of the staggered tabs. Alternatively, when the tabs 110 are possibly to be staggered from each other, the edge 110a may be the edge of the tabs 110 at a position where the staggering amount falls within a specified staggering tolerance threshold.

In these embodiments, the edge of the tab 110 does not extend beyond the insulation piece 200, thereby preventing the tab 110 from crossing the insulation piece 200 and lapping the adapter component 500, and in turn, alleviating the short-circuiting problem of the battery cell 40.

According to some embodiments of this application, the tab 110 includes a positive tab and a negative tab. The adapter component 500 connects the positive tab and the electrode terminal 310. A first cross-sectional area of the transitional connecting region 530 is A, a second cross-sectional area of the negative tab 110 is B, and the first cross-sectional area and the second cross-sectional area satisfy 3A<2B.

Understandably, the positive tab may be connected to the positive electrode terminal by the adapter component 500 described in any one of the above embodiments. The insulation piece 200 may be omitted on another adapter component that connects the negative tab to the negative electrode terminal.

In such optional embodiments, in a case that the battery cell is thermally runaway, the transitional connecting region 530 is more easily breakable than the negative tab, so that the current flow path between the positive tab and the electrode terminal 310 can be cut off in time, thereby further improving the safety performance of the battery cell 40.

Optionally, the adapter component 500 may be made of a material including aluminum or copper. The tab 110 may also be made of a material including aluminum or copper. The flow capacity of aluminum is approximately 4 $A/mm^2$ to 5 $A/mm^2$. For example, the flow capacity of aluminum is 5 $A/mm^2$. The flow capacity of copper is approximately 7 $A/mm^2$ to 9 $A/mm^2$. For example, the flow capacity of copper is 8 $A/mm^2$.

In some embodiments, the positive tab and the adapter component 500 are made of a material including aluminum, and the negative tab is made of a material including copper.

In these embodiments, the positive tab and the adapter component 500 are made of the same material. When the positive tab is welded to the adapter component 500, the connection strength can be increased between the positive tab and the adapter component 500. The negative tab includes copper. When the first cross-sectional area A and the second cross-sectional area B satisfy the above relation, the adapter component 500 can be broken before the negative tab.

According to some embodiments of this application, the tab 110 includes a plurality of sub-tabs. A thickness of each sub-tab is Z, the number of the sub-tabs is X, and a width of the sub-tab is D, satisfying: $B=X \times D \times Z$.

Optionally, a plurality of sub-tabs of the tab 110 are stacked up together.

Optionally, when the plurality of sub-tabs included in the tab 11 vary in width, the width D of the sub-tab is the average width of the plurality of sub-tabs.

Optionally, 15 mm<X<150 mm, 20 mm<D<50 mm, and 3 μm<Z<20 μm.

In such optional embodiments, the tab 110 is generally formed by stacking a plurality of sub-tabs. The second cross-sectional area of the tab 110 is a sum of the cross-sectional areas of THE plurality of stacked sub-tabs, so that the calculation of the second cross-sectional area of the tab 110 is more accurate.

According to some embodiments of this application, still referring to FIG. 6 and FIG. 7, the transitional connecting region 530 includes a first part 531 connected to the second connecting region 520 and a second part 532 connected to the first connecting region 510. A cross-sectional area of the first part 531 is smaller than a cross-sectional area of the second part 532. The second part 532 includes a penetrating through-hole 532a. At least a part of the insulation piece 200 is embedded in the through-hole 532a. The dashed line in FIG. 7 shows a boundary between the first part 531 and the second part 532. The dashed line does not constitute any limitation on the structure of the battery cell according to an embodiment of this application.

When the adapter component 500 is equalized in thickness at every position, the cross-sectional area of the first part 531 being greater than the cross-sectional area of the second part 532 may mean that the width of the first part 531 is greater than the width of the second part 532.

In such optional embodiments, the insulation piece 200 is partially embedded in the through-hole 532a, thereby improving the stability of the relative position between the insulation piece 200 and the adapter component 500.

According to some embodiments of this application, still referring to FIG. 6 and FIG. 7, the second connecting region 520 protrudes beyond the first connecting region 510. The transitional connecting region 530 includes a corner part 533. The insulation piece 200 covers at least the corner part 533.

The dimensional difference between the second connecting region 520 and the first connecting region 510 or the bending of the adapter component 500 gives rise to a corner part 533 in the transitional connecting region 530. The corner part 533 is prone to stress concentration, thereby causing the corner part 533 to be prone to be broken by mechanical vibration, in turn, impairing the service life of the adapter component 500.

In such optional embodiments, the insulation piece 200 covering the corner part 533 can provide protection for the corner part 533 and alleviate the problem that the corner part 533 is prone to be damaged by collision.

Figure 9:
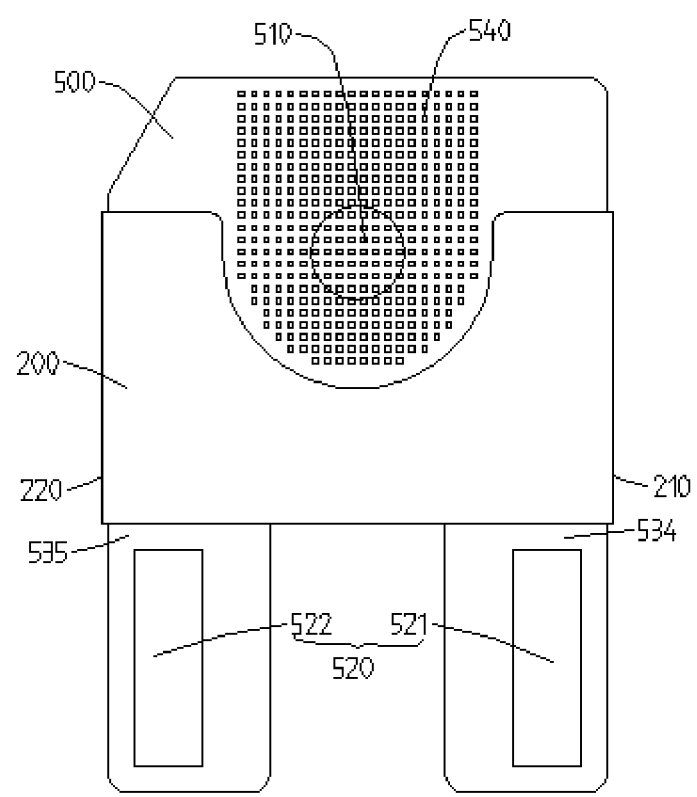
FIG. 9 is a schematic structural diagram of mutual coordination between an adapter component and an insulation piece in a battery cell according to another embodiment of this application.
Figure 10:
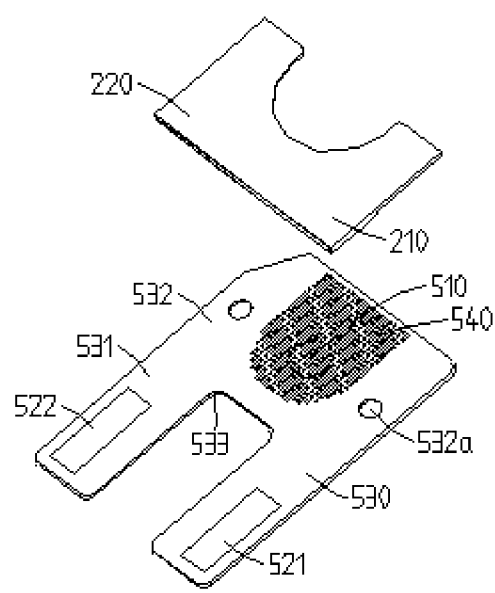
FIG. 10 is a schematic exploded view of FIG. 9.

Referring to FIG. 4 to FIG. 10 together, FIG. 9 is a schematic structural diagram of an adapter component and an insulation piece in a battery cell 40 according to some other embodiments of this application; and FIG. 10 is a schematic exploded view of FIG. 9.

According to some embodiments of this application, still referring to FIG. 4 to FIG. 10, the electrode assembly 100 includes a first electrode assembly 101 and a second electrode assembly 102. The first electrode assembly 101 includes a first tab 111. The second electrode assembly 102 includes a second tab 112. The second connecting region 520 includes a first sub-region 521 configured to be connected to the first tab 111 and a second sub-region 522 configured to be connected to the second tab 112. The transitional connecting region 530 includes a first partition 534 located between the first sub-region 521 and the first connecting region 510 as well as a second partition 535 located between the second sub-region 522 and the first connecting region 510. The insulation piece 200 includes a first subsection 210 configured to cover at least a part of the first partition 534 and a second subsection 220 configured to cover at least a part of the second partition 535. The first subsection 210 and the second subsection 220 are separate from each other or formed in one piece.

The first tab 111 and the second tab 112 may be positive tabs, or, the first tab 111 and the second tab 112 may be negative tabs.

In such optional embodiments, first, the battery cell 40 includes a plurality of electrode assemblies 100, that is, a first electrode assembly 101 and a second electrode assembly 102. The plurality of electrode assemblies 100 can increase the capacitance of the battery cell 40. When the battery cell 40 includes a first electrode assembly 101 and a second electrode assembly 102, a first tab 111 is disposed on the first electrode assembly 101, and a second tab 112 is disposed on the second electrode assembly 102. The second connecting region 520 can be connected to the first tab 111 and the second tab 112 simultaneously through the first sub-region 521 and the second sub-region 522 respectively, so that the same connecting component connects the electrode terminal 310 to the tabs of the two electrode assemblies 100. When the second connecting region 520 includes a first sub-region 521 and a second sub-region 522, the corresponding transitional connecting region 530 includes a first partition 534 located between the first sub-region 521 and the first connecting region 510, and a second partition 535 located between the second sub-region 522 and the first connecting region 510. The insulation piece 200 includes a first subsection 210 and a second subsection 220. The first subsection 210 and the second subsection 220 cover the first partition 534 and the second partition 535, respectively. In this way, when the battery cell 40 is thermally runaway, both the first partition 534 and the second partition 535 can be easily broken, thereby cutting off the current flow path between the first tab 111 and the electrode terminal 310 as well as the current flow path between the second tab 112 and the electrode terminal 310 in time, and further improving the safety performance of the battery cell 40.

As shown in FIG. 6 and FIG. 7, the first subsection 210 and the second subsection 220 may be disposed separately. In other words, the first subsection 210 and the second subsection 220 are spaced apart.

Alternatively, as shown in FIG. 9 and FIG. 10, the first subsection 210 and the second subsection 220 may be formed in one piece to simplify the structure of the insulation piece 200 and increase the structural strength of the insulation piece 200. In addition, when the first partition 534 and the second partition 535 are disposed separately, that is, when the first partition 534 and the second partition 535 are spaced apart along the second direction Y, a corner part 533 is disposed between the first partition 534 and the second partition 535. The first subsection 210 and the second subsection 220 being formed in one piece can cover the corner part 533 more effectively.

As shown in FIG. 6 to FIG. 10, the first sub-region 521 and the second sub-region 522 may be spaced apart from each other. For example, the first sub-region 521 and the second sub-region 522 are spaced apart along a direction in which the first electrode assembly 101 and the second electrode assembly 102 are arranged in parallel, so as to reduce the required amount of material of the adapter component 500. Correspondingly, the first partition 534 and the second partition 535 may be disposed separately to further reduce the required amount of material of the adapter component 500. In this case, the adapter component 500 includes a first sub-region 521 and a second sub-region 522 that are located on the same side of the first connecting region 510 and that are spaced apart along a direction in which the first electrode assembly 101 and the second electrode assembly 102 are arranged in parallel, and includes a first partition 534 and a second partition 535 spaced apart along a direction in which the first electrode assembly 101 and the second electrode assembly 102 are arranged in parallel.

Figure 11:
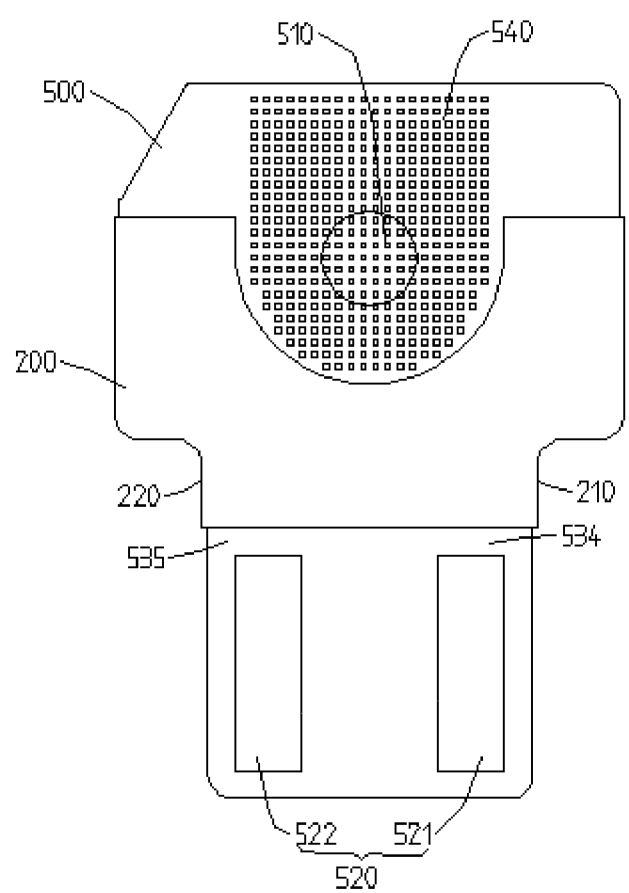
FIG. 11 is a schematic structural diagram of mutual coordination between an adapter component and an insulation piece in a battery cell according to still another embodiment of this application.
Figure 12:
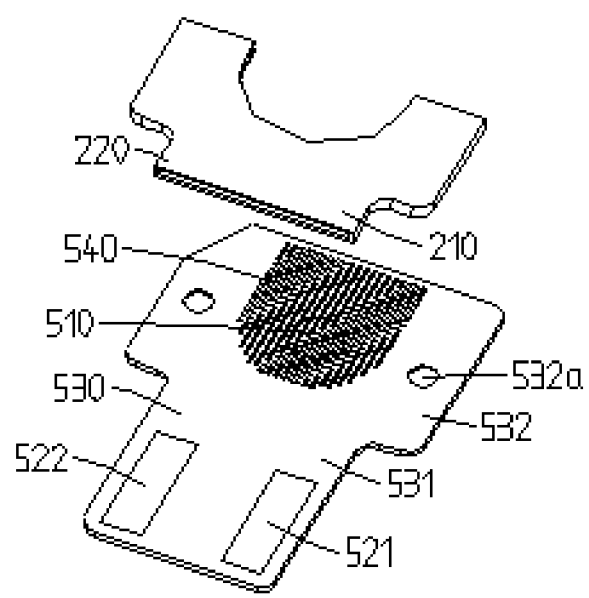
FIG. 12 is a schematic exploded view of FIG. 11.

Referring to FIG. 11 and FIG. 12, FIG. 11 is a schematic structural diagram of an adapter component and an insulation piece in a battery cell 40 according to still some other embodiments of this application; and FIG. 12 is a schematic exploded view of FIG. 11.

According to some embodiments of this application, as shown in FIG. 1 and FIG. 12, the first sub-region 521 and the second sub-region 522 are interconnected into one piece, the first partition 534 and the second partition 535 are interconnected into one piece, and the first subsection 210 and the second subsection 220 are interconnected into one piece.

In such optional embodiments, the first sub-region 521 and the second sub-region 522 are interconnected into one piece, and the second partition 535 and the first partition 534 are interconnected into one piece, thereby simplifying the structure of the adapter component 500. The first subsection 210 and the second subsection 220 are interconnected into one piece, thereby simplifying the structure of the insulation piece 200.

According to some embodiments of this application, as shown in FIG. 6 to FIG. 12, the adapter component 500 further includes an embossed region 540. The first connecting region 510 is located inside the embossed region 540, and the insulation piece 200 and the embossed region 540 are spaced apart.

The embossed region 540 may be a region of a relatively high friction coefficient on the adapter component 500. A friction bulge may be disposed in the embossed region 540. The shape of the embossed region 540 may be at least one of a circle, a polygon, an ellipse, or a combination thereof.

In such optional embodiments, the first connecting region 510 is located inside the embossed region 540, and the electrode terminal 310 and the adapter component 500 are interconnected in the embossed region 540. For example, the electrode terminal 310 and the adapter component 500 are welded to each other in the embossed region 540. The insulation piece 200 and the embossed region 540 are spaced apart, thereby alleviating the impact of high temperature on the insulation piece 200 during welding, and alleviating the problem of the insulation piece 200 melting due to heat.

According to some embodiments of this application, as shown in FIG. 5, a minimum distance m between the insulation piece 200 and the first connecting region 510 is 0.5 mm to 4 mm, and/or a minimum distance n between the insulation piece 200 and the second connecting region 520 is 0.5 mm to 4 mm.

In such optional embodiments, the minimum distance m between the insulation piece 200 and the first connecting region 510 is 0.5 mm to 4 mm, thereby alleviating the problem that the insulation piece 200 is prone to be deformed by heat during welding between the first connecting region 510 and the electrode terminal 310 due to an insufficient distance between the insulation piece 200 and the first connecting region 510. On the other hand, this setting also alleviates the problem that the transitional connecting region 530 can be hardly melted off due to an insufficient temperature rise speed at the transitional connecting region, where the insufficient temperature rise speed is caused by an insufficient size of the insulation piece 200 that arises from an excessive distance between the insulation piece 200 and the first connecting region 510. The minimum distance n between the insulation piece 200 and the second connecting region 520 is 0.5 mm to 4 mm, thereby alleviating the problem that the insulation piece 200 is prone to be deformed by heat during welding between the second connecting region 520 and the tab 110 due to an insufficient distance between the insulation piece 200 and the second connecting region 520. On the other hand, this setting also alleviates the problem that the transitional connecting region 530 can be hardly melted off due to an insufficient temperature rise speed at the transitional connecting region, where the insufficient temperature rise speed is caused by an insufficient size of the insulation piece 200 that arises from an excessive distance between the insulation piece 200 and the first connecting region 510.

According to some embodiments of this application, this application further provides a battery. The battery includes the battery cell 40 disclosed in any one of the above technical solutions.

According to some embodiments of this application, this application further provides an electrical device. The electrical device includes the battery cell 40 disclosed in any one of the above technical solutions, and the battery cell 40 is configured to provide electrical energy for the electrical device.

The electrical device may be any device or system in which the battery cell 40 is applied.

As shown in FIG. 4 to FIG. 12, the battery cell 40 includes: an end cap assembly 300, a housing 400, an electrode assembly 100, an adapter component 500, and an insulation piece 200. The end cap assembly 300 includes an electrode terminal 310. An opening 410 is created on the housing 400. The end cap assembly 300 seals the opening 410. The electrode assembly 100 is disposed in the housing 400. The electrode assembly 100 includes a tab 110. An adapter component 500 is connected between the tab 110 and the electrode terminal 310. The adapter component 500 includes a first connecting region 510 configured to be connected to the electrode terminal 310, a second connecting region 520 configured to be connected to the tab 110, and a transitional connecting region 530 located between the first connecting region 510 and the second connecting region 520. The insulation piece 200 covers at least a part of the transitional connecting region 530. A minimum cross-sectional area of the transitional connecting region 530 is greater than or equal to a minimum cross-sectional area of the first connecting region 510, and/or a minimum cross-sectional area of the transitional connecting region 530 is greater than or equal to a minimum cross-sectional area of the second connecting region 520. The insulation piece 200 surrounds an outer circumference of the transitional connecting region 530. A first cross-sectional area of the transitional connecting region 530 is A, a second cross-sectional area of the negative tab 110 is B, and the first cross-sectional area and the second cross-sectional area satisfy 2A<3B. The second connecting region 520 protrudes beyond the first connecting region 510. The transitional connecting region 530 includes a corner part 533. The insulation piece 200 covers at least the corner part 533. The adapter component 500 further includes an embossed region 540. The first connecting region 510 is located inside the embossed region 540, and the insulation piece 200 and the embossed region 540 are spaced apart. A minimum distance m between the insulation piece 200 and the first connecting region 510 is 0.5 mm to 4 mm, and/or a minimum distance n between the insulation piece 200 and the second connecting region 520 is 0.5 mm to 4 mm.

Finally, it is hereby noted that the foregoing embodiments are merely intended to describe the technical solutions of this application but not to limit this application. Although this application has been described in detail with reference to the foregoing embodiments, a person of ordinary skill in the art understands that modifications may still be made to the technical solutions described in the foregoing embodiments, or equivalent replacements may still be made to some or all technical features in the technical solutions. Such modifications and equivalent replacements fall within the scope of the claims and specification hereof without making the essence of the corresponding technical solutions depart from the scope of the technical solutions of the embodiments of this application. Particularly, to the extent that no structural conflict exists, various technical features mentioned in different embodiments may be combined in any manner. This application is not limited to the specific embodiments disclosed herein, but includes all technical solutions falling within the scope of the claims.

What is claimed is:

1. A battery cell, comprising:
an end cap assembly, comprising an electrode terminal;
a housing, on which an opening is created, wherein the end cap assembly seals the opening;
an electrode assembly, disposed in the housing, wherein the electrode assembly comprises a tab;
an adapter component, connected between the tab and the electrode terminal, wherein the adapter component comprises a first connecting region configured to be connected to the electrode terminal, a second connecting region configured to be connected to the tab, a transitional connecting region located between the first connecting region and the second connecting region, and an embossed region comprising a plurality of friction bulges, the first connecting region is located inside the embossed region, and a friction coefficient of the embossed region is greater than a friction coefficient of a region of the adapter component other than the embossed region; and
an insulation piece, covering at least a part of the transitional connecting region, the insulation piece and the embossed region being spaced apart.

2. The battery cell according to claim 1, wherein a minimum cross-sectional area of the transitional connecting region is greater than or equal to a minimum cross-sectional area of the first connecting region, and/or a minimum cross-sectional area of the transitional connecting region is greater than or equal to a minimum cross-sectional area of the second connecting region.

3. The battery cell according to claim 1, wherein the insulation piece surrounds an outer circumference of the transitional connecting region.

4. The battery cell according to claim 1, wherein at least a part of the tab covers the insulation piece, and an edge, oriented toward the first connecting region, of the tab does not extend beyond the insulation piece.

5. The battery cell according to claim 1, wherein:
the tab comprises a positive tab and a negative tab;
the adapter component connects the positive tab and the electrode terminal; and
a first cross-sectional area A of the transitional connecting region and a second cross-sectional area B of the negative tab satisfy 3A<2B.

6. The battery cell according to claim 5, wherein the positive tab and the adapter component are made of a material comprising aluminum, and the negative tab is made of a material comprising copper.

7. The battery cell according to claim 5, wherein the tab comprises a plurality of sub-tabs, and a thickness Z of each sub-tab, a number X of the sub-tabs, and a width D of the sub-tab satisfy: B=X×D×Z.

8. The battery cell according to claim 1, wherein the transitional connecting region comprises a first part connected to the first connecting region and a second part connected to the second connecting region, a cross-sectional area of the first part is greater than a cross-sectional area of the second part, the first part comprises a penetrating through-hole, and at least a part of the insulation piece is embedded in the through-hole.

9. The battery cell according to claim 1, wherein the second connecting region protrudes beyond the first connecting region, the transitional connecting region comprises a corner part, and the insulation piece covers at least the corner part.

10. The battery cell according to claim 1, wherein:
the electrode assembly comprises a first electrode assembly and a second electrode assembly, the first electrode assembly comprises a first tab, and the second electrode assembly comprises a second tab;
the second connecting region comprises a first sub-region configured to be connected to the first tab and a second sub-region configured to be connected to the second tab;
the transitional connecting region comprises a first partition located between the first sub-region and the first connecting region as well as a second partition located between the second sub-region and the first connecting region; and
the insulation piece comprises a first subsection configured to cover at least a part of the first partition and a second subsection configured to cover at least a part of the second partition, and the first subsection and the second subsection are separate from each other or formed in one piece.

11. The battery cell according to claim 10, wherein the first sub-region and the second sub-region are interconnected into one piece, the first partition and the second partition are interconnected into one piece, and the first subsection and the second subsection are interconnected into one piece.

12. The battery cell according to claim 1, wherein a minimum distance between the insulation piece and the first connecting region is 0.5 mm to 4 mm, and/or a minimum distance between the insulation piece and the second connecting region is 0.5 mm to 4 mm.

13. A battery, comprising the battery cell according to claim 1.

14. An electrical device, comprising the battery cell according to claim 1, wherein the battery cell is configured to provide electrical energy.

* * * * *